United States Patent
Yeo (10) Patent No.: US 7,167,961 B2
(45) Date of Patent: Jan. 23, 2007

(54) SINGLE HEAD DISK DRIVE HAVING BACKUP SYSTEM INFORMATION AND METHOD OF RECORDING AND/OR READING SYSTEM INFORMATION THEREOF

(75) Inventor: Chang-dong Yeo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 532 days.

(21) Appl. No.: 10/771,116

(22) Filed: Feb. 4, 2004

(65) Prior Publication Data
US 2005/0027935 A1    Feb. 3, 2005

(30) Foreign Application Priority Data
Feb. 5, 2003    (KR) .................. 10-2003-0007113

(51) Int. Cl.
    *G06F 12/00* (2006.01)
(52) U.S. Cl. .................. 711/162; 711/111; 711/154; 711/156; 714/6
(58) Field of Classification Search ................ 711/162, 711/111, 154, 156; 714/6
    See application file for complete search history.

(56) References Cited

U.S. PATENT DOCUMENTS

| | | | | |
|---|---|---|---|---|
| 5,027,241 A | * | 6/1991 | Hatch et al. | 360/255 |
| 5,208,712 A | * | 5/1993 | Hatch et al. | 360/98.01 |
| 5,459,853 A | * | 10/1995 | Best et al. | 711/114 |
| 6,067,199 A | * | 5/2000 | Blumenau | 360/48 |
| 6,134,062 A | * | 10/2000 | Blumenau | 360/48 |
| 6,163,422 A | * | 12/2000 | Blumenau | 360/47 |
| 6,278,566 B1 | * | 8/2001 | Blumenau | 360/48 |
| 6,282,041 B1 | * | 8/2001 | Blumenau | 360/48 |
| 2002/0136537 A1 | * | 9/2002 | Takahashi | 386/95 |
| 2004/0136104 A1 | * | 7/2004 | Chiao et al. | 360/31 |
| 2005/0240756 A1 | * | 10/2005 | Mayer | 713/2 |
| 2006/0018051 A9 | * | 1/2006 | Chiao et al. | 360/31 |

FOREIGN PATENT DOCUMENTS

| | | |
|---|---|---|
| JP | 4-178975 | 6/1992 |
| JP | 04-372776 | 12/1992 |
| JP | 4-372776 | 12/1992 |
| JP | 07-249270 | 9/1995 |
| JP | 2002-208223 | 7/2002 |
| JP | 2002-288938 | 10/2002 |
| KR | 2001-54379 | 7/2001 |
| WO | WO 98/57323 | 12/1998 |

OTHER PUBLICATIONS

Notice of Office Action issued by the Korean Patent Office on Mar. 17, 2005, in the corresponding Korean Application No. 10-2003-0007113.

* cited by examiner

*Primary Examiner*—Stephen C. Elmore
(74) *Attorney, Agent, or Firm*—Staas & Halsey LLP

(57) ABSTRACT

A disk drive having a single head for recording data on and reading data from a disk-type recording medium, the disk drive including: a spindle motor to rotate the disk-type recording medium; and a controller to drive the spindle motor and the single head. The controller drives the single head to record system information of the disk drive on an original copy portion and at least one backup copy portion of the disk-type recording medium.

27 Claims, 4 Drawing Sheets

SINGLE HEAD DISK DRIVE HAVING BACKUP SYSTEM INFORMATION AND METHOD OF RECORDING AND/OR READING SYSTEM INFORMATION THEREOF

CROSS-REFERENCE TO RELATED APPLICATIONS

This application claims the benefit of Korean Patent Application No. 2003-7113, filed on Feb. 5, 2003, in the Korean Intellectual Property Office, the disclosure of which is incorporated herein by reference.

BACKGROUND OF THE INVENTION

1. Field of the Invention

The present invention relates to a disk drive, and more particularly, to a method of recording and/or reading system information of a single head disk drive.

2. Description of the Related Art

With regard to the operation of a disk drive, pieces of important information regarding recording and/or reading channels and a servo operation, i.e., system information, are stored in a different location than ordinary data. The reason is that damage to or loss of part of the system information may cause the entire disk drive to malfunction or stop functioning, while damage to or loss of the ordinary data does not considerably affect the operation of the disk drive. Therefore, the system information is stored in a much safer recording zone on a disk-type recording medium than a recording zone where the ordinary data is stored. Then, whenever the disk drive is turned on, the system information is read from the disk-type recording medium so that the disk drive is enabled to normally operate.

The system information on the operation of the disk drive includes servo correction/optimization information regarding a head's track following and seeking operations, channel optimization information regarding optimization of a reading channel, from which the head reads data, and a recording channel, in which the head records data, and defect information regarding physical defects on a disk-type recording medium. If the servo correction/optimization information is damaged or lost, track following and track seeking operations cannot be normally carried out, thus causing the disk drive to malfunction and increasing the time taken to search for desired data. If the channel optimization information is damaged or lost, data reading and data recording operations are carried out by simply using channel values that do not optimally reflect a data recording/reading environment for the hardware state of the disk drive. If the defect information is damaged or lost, important data may be accidentally recorded in a defective area from which data may not be properly read. In short, the system information is very important for proper operation of the disk drive.

A conventional disk drive records data on a plurality of recording media. Therefore, a plurality of heads are provided respectively for the plurality of recording media, and system information is stored in each of the plurality of recording media in order to guarantee the stability of the system information. Then, even when one of the plurality of recording media becomes defective due to external shock and thus the system information cannot be properly read from the defective recording medium, it is still possible to safely maintain the system information because the system information can be read from other recording media.

Currently, an increasing number of disk drives are manufactured with a single head rather than a plurality of heads. Due to the steady increase in the recording density of recording media, a single recording medium can achieve the same storage capacity that used to be provided by a plurality of recording media. In addition, using a single recording medium is more cost-effective than using a plurality of recording media. Moreover, by using a single recording medium, it is possible to manufacture a compact-sized disk drive. However, in the case of a disk drive with a single head, unlike in the case of a conventional disk drive adopting a plurality of recording media, it is impossible to make a backup of system information for guaranteeing the stability of the system information. Thus, once the system information is damaged or lost due to external shock, the entire disk drive may malfunction or undesirably stop functioning.

Therefore, the drive with a single head, like the disk drive with a plurality of heads, needs an efficient method of making a backup of system information necessary for the operation of the disk drive.

SUMMARY OF THE INVENTION

The present invention provides a single head disk drive having backup system information.

The present invention also provides a method of recording and reading system information of a single head disk drive. The method can make a backup copy of the system information, which is very important for the operation of the single head disk drive.

According to an aspect of the present invention, there is provided a disk drive having a single head for recording data on and reading data from a disk-type recording medium. The disk drive includes a spindle motor which rotates the disk-type recording medium; and a controller which drives the spindle motor and the single head. Here, the controller drives the single head to record system information of the disk drive on an original copy portion and at least one backup copy portion of the disk-type recording medium.

The controller is a micro-controller controlled by firmware. The controller reads the system information from the backup copy portion of the disk-type recording medium when the system information cannot be read from the original copy portion of the disk-type recording medium and restores the system information read from the backup portion of the disk-type recording medium onto the original copy portion of the disk-type recording medium.

The controller sets the original copy portion and backup copy portion of the disk-type recording medium so that they are as far away from each other as possible.

The system information includes at least one of servo correction/optimization information regarding the single head's track following and track seeking operations, recording and reading channel optimization information regarding optimization of recording and reading channels, and defect information regarding physical defects on the disk-type recording medium.

In addition, there is provided a method of recording system information of a disk drive on a disk-type recording medium and reading the system information from the disk-type recording medium, the disk drive having a single head for recording data on and reading data from the disk-type recording medium. The method involves preparing the system information; determining an original copy portion and at least one backup copy portion of the disk-type recording medium on which the system information is to be recorded; storing the system information in the original copy portion and backup copy portion of the disk-type recording medium; and reading the system information from the disk-type recording medium.

The original copy portion and backup copy portion of the disk-type recording medium are determined so that they are as far away from each other as possible.

Reading the system information from the disk-type recording medium, involves reading the system information from the original copy portion of the disk-type recording medium; determining whether or not the system information has been successfully read from the original copy portion of the disk-type recording medium; reading the system information from the backup copy portion of the disk-type recording medium if the system information is determined to have been unsuccessfully read from the original copy portion of the disk-type recording medium; determining whether or not the system information has been successfully read from the backup copy portion of the disk-type recording medium; warning a user that an error has occurred on the disk-type recording medium if the system information is determined to have been unsuccessfully read from the backup copy portion of the disk-type recording medium; and restoring the system information read from the backup copy portion of the disk-type recording medium onto the original backup portion of the disk-type recording medium if the system information is determined to have been successfully read from the backup copy potion of the disk-type recording medium.

Restoring the system information read from the backup copy portion of the disk-type recording medium onto the original backup portion of the disk-type recording medium, involves determining whether or not the system information has been successfully recorded on the original copy portion of the disk-type recording medium; changing the original copy portion of the disk-type recording medium with another portion of the disk-type recording medium if the system information is determined to have been unsuccessfully recorded on the original copy portion; and restoring the system information read from the backup copy portion of the disk-type recording medium onto the renewed original copy portion of the disk-type recording medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
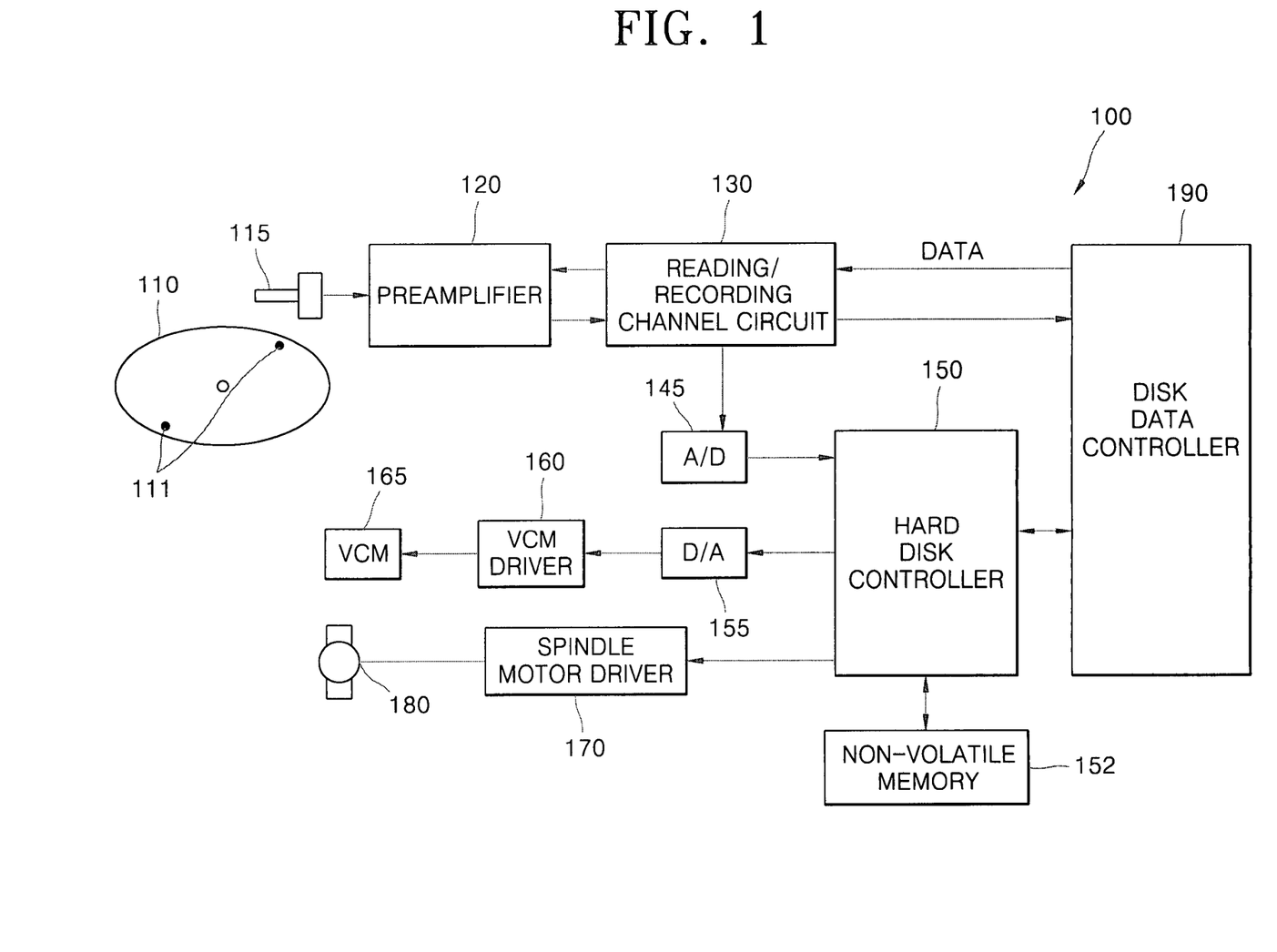
FIG. 1 is a block diagram of a disk drive having a single head according to an embodiment of the present invention.

FIG. 1 is a block diagram of a disk drive having a single head according to an embodiment of the present invention. Referring to FIG. 1, a disk drive 100 includes a disk-type recording medium 110 on which ordinary data and system information are recorded, a single head 115 which records data on or reads data from the disk-type recording medium 110, a preamplifier 120 which amplifies a signal output from the single head 115, a reading/recording channel circuit 130 which processes a signal output from the preamplifier 120, a disk data controller 190, a disk controller 150, a rotating voice coil motor (VCM) 165, a VCM driver 160, non-volatile memory 152, a spindle motor driver 170, and a spindle motor 180. In addition, the disk drive 100 further includes an analog/digital converter 145 which converts an analog signal input into or output from the disk drive 100 into a digital signal and a digital/analog signal converter 155 which converts a digital signal input into or output from the disk drive 100 into an analog signal. The general operation of the disk drive is as follows.

The disk-type recording medium 110 is rotated by the spindle motor 180. The disk-type recording medium 110 includes a plurality of concentric tracks, a parking zone on which the single head 115 is placed when not in use, and a data zone on which data is recorded. The single head 115 records data on or reads data from the disk-type recording medium 110 while being enabled to horizontally move over the disk-type recording medium 110 by the rotating VCM 165. Data read from the disk-type recording medium 110 is amplified by the preamplifier 120 and then transmitted to the reading/recording channel circuit 130. Encoded data transmitted from the reading/recording channel circuit 130 is recorded on the disk-type recording medium 110 by the single head 115. The read data and the recorded data are received from or transmitted to a host computer outside the disk drive 100. The reading/recording channel circuit 130 generates a position error signal (PES) by modulating servo information, which is part of system information stored in the disk-type recording medium 110. Then, the position error signal is sent to the disk controller 150 via the analog/digital converter 145. The disk controller 150 controls the single head 115's track following and track seeking operations in response to the position error signal. In addition, the disk controller 150 carries out servo control in response to a variety of servo-related signals input from a gate array (not shown). The digital/analog converter 155 converts a command to control the position of the single head 115 issued by the disk controller 150 into an analog signal and then transmits the analog signal to the VCM driver 160. The VCM driver 160 drives the VCM 165 in response to the reception of the analog signal from the digital/analog converter 24. The spindle motor driver 170 drives the spindle motor 180 according to a command issued by the disk controller 150, thus rotating the disk-type recording medium 110. The non-volatile memory 152 connected to the disk controller 150 stores an application program for the operation of the disk drive 100 and system information 111 of the disk drive 100, which are read from the disk-type recording medium 110.

A method of recording and/or reading the system information 111 of the disk drive 110 will be described in the following paragraphs.

The disk controller 150 creates the system information 111, which is necessary for the operation of the disk drive 100. The system information 111 includes servo correction/optimization information for the single head 115's track following and track seeking operations, recording and reading channel optimization information, and defect information regarding defects on the disk-type recording medium 110. Several thousand data tracks exist on the disk-type recording medium 110. Therefore, it is very important to place the single head 115 over a desired track and maintain the position of the single head 115 until reading data from the desired track and/or recording data on the desired track is completed. In this regard, it is necessary to record servo information on the disk-type recording medium 110. The servo information includes a servo phase locked loop (PLL), a servo address mark, a gray code, and a servo burst used for generating a position error signal. The gray code and the servo burst are necessary for controlling the movement of the single head 115 along a radial direction of the disk-type recording medium 110. The gray code, which is a serial number allotted to each of the tracks on the disk-type recording medium 110, indicates the position of each of the tracks. The servo burst is a signal used for controlling the single head 115 to more precisely move between tracks. Therefore, for the single head 115's track following and track seeking operations, it is very important to optimize and correct the servo information based on the characteristics of the disk drive 100.

A short explanation of the recording and reading channel optimization information is as follows. In general, a disk drive is manufactured by assembling a variety of parts into a single device. Since those parts constituting the disk drive have different hardware characteristics from one another, it is necessary to provide parameters to compensate for the different hardware characteristics of the parts of the disk drive. In particular, process variations of a head, a disk-type medium, and a spindle motor should be compensated for. Therefore, in order to compensate for the different hardware characteristics of each of the parts of the disk drive, reading channel parameters are optimized during a burn-in process, during which optimal channel parameters are set in consideration of the variation of the performance of the disk drive and the variation of bit error rate when applying various values to each of the reading channel parameters. In such channel optimization process, cut-off frequency, write current, read current, a noise predictive Viterbi value, and a write pre-compensation value are optimized. The above-mentioned channel parameters are optimized according to the hardware characteristics of the disk drive, and thus the recording and reading channel optimization information is very important for the operation of the disk drive.

The defect information of the disk-type recording medium 110 is used for preventing data from being recorded on a defective portion of the disk-type recording medium 110. In other words, the disk controller 150 reads the defect information from the disk-type recording medium 110 and prevents data from being recorded on a defective portion of the disk-type recording medium 110. In this disclosure, the servo correction/optimization information, recording and reading channel optimization information, and the defect information are called system information.

The disk drive 110 records the system information 111 on two different portions of the disk-type recording medium 110, i.e., a portion of the disk-type recording medium 110 on which an original copy of the system information 111 is recorded (hereinafter, referred to as an original copy portion) and the other portion of the disk-type recording medium on which a backup copy of the system information 111 is recorded (hereinafter, referred to as a backup copy portion). Therefore, in a case where the system information 111 cannot be read from the original copy portion of the disk-type recording medium 110 because of a physical defect on the disk-type recording medium 110, it can be read from the backup copy portion of the disk-type recording medium 110. By recording the system information 111 on the two different portions of the disk-type recording medium 110, i.e., the original copy portion and the backup copy portion, the system information 111 of the disk drive 100 can be more stably and safely managed. In addition, the system information 111 read from the backup copy portion of the disk-type recording medium can be restored onto the original copy portion of the disk-type recording medium 110. When a physical defect occurs on one portion of the disk-type recording medium 110, it generally spreads to neighboring portions of the disk-type recording medium 110. Therefore, in order to prevent a defect occurring on a certain part of the disk-type recording medium 110 from spreading to neighboring portions of the disk-type recording medium 110, the original copy portion of the disk-type recording medium 110 is as far away from the backup copy portion of the disk-type recording medium 110. As shown in FIG. 1, the system information 111 is recorded on two different portions of the disk-type recording medium 110, which are located approximately 180° apart from each other.

Figure 2:
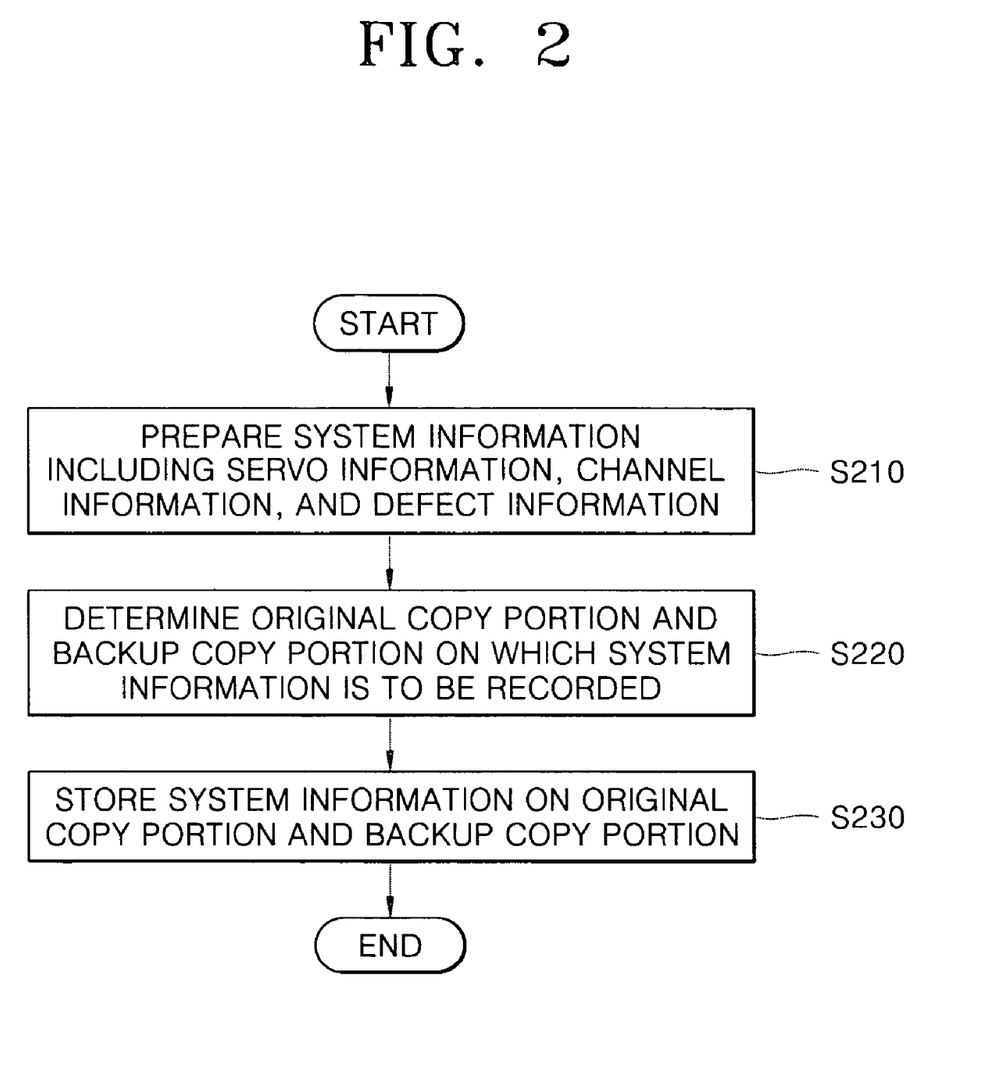
FIG. 2 is a flowchart of a method of recording system information into and reading system information from a single head disk drive.

FIG. 2 is a flowchart of a method of recording and reading system information of a single head disk drive according to an embodiment of the present invention. Referring to FIG. 2, system information to be recorded on a disk-type recording medium is prepared in operation S210. As described above, the system information includes servo correction/optimization information, recording and reading channel optimization information, and defect information. Any type of servo correction/optimization method and channel optimization method can be applied in operation S210.

In operation S220, it is determined which parts of the disk-type recording medium should be an original copy portion and a backup copy portion, respectively. The original copy portion and the backup copy portion are located approximately 180° apart from each other.

In operation S230, the system information is recorded on both the original copy portion and backup copy portion of the disk-type recording medium. The system information does not always have to be recorded on only the two portions of the disk-type recording medium. Rather, if the system information is recorded on more than two portions of the disk-type recording medium, it can be more safely managed. However, if the system information is recorded on too many portions of the disk-type recording medium, the area of a data zone of the disk-type recording medium on which ordinary data can be recorded decreases. In short, the system information can be stored on more than two portions of the disk-type recording medium.

Figure 3:
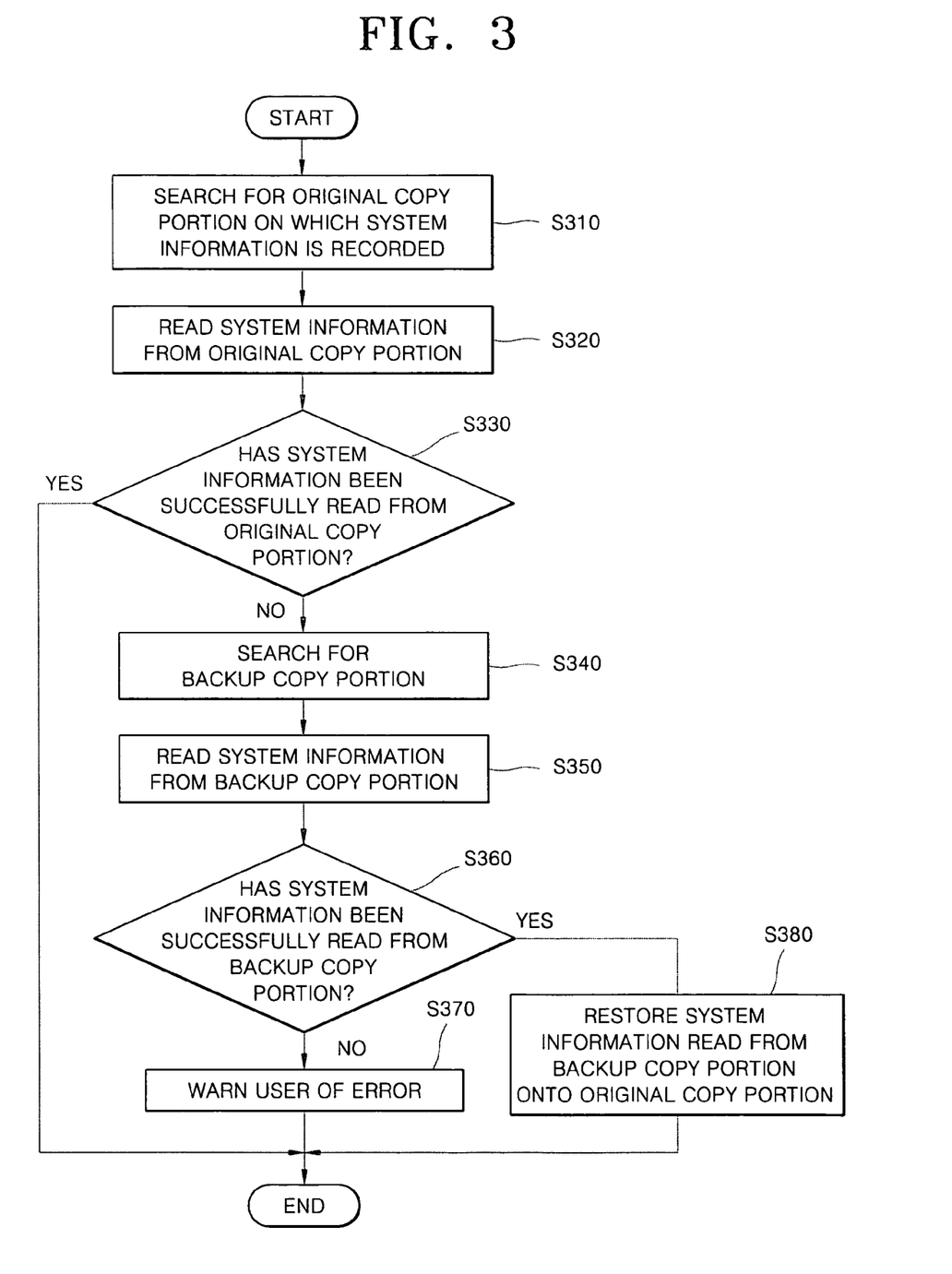
FIG. 3 is a flowchart of a method of recording system information into and reading system information from a single head disk drive.

FIG. 3 is a flowchart of a method of recording and reading system information of a single head disk drive according to another embodiment of the present invention. Referring to FIG. 3, in operation S310, an original copy portion of a disk-type recording medium on which an original copy of system information of a disk drive is stored is searched for at an initial operation stage of the disk drive. In operation S320, the system information is read from the searched original copy portion of the disk-type recording medium.

In operation S330, it is determined whether or not the system information has been successfully read from the original copy portion of the disk-type recording medium in operation S320, by, for example, creating a parity value for the read system information and comparing the parity value with a previously stored parity value or checking whether or not a bit error rate obtained in the process of reading the system information from the original copy portion of the disk-type recording medium exceeds a predetermined value.

If the system information is determined to have been successfully read from the original copy portion of the disk-type recording medium, the read system information is determined as being valid, and then the entire process of reading the system information from the disk-type recording medium is completed. The read system information is stored in non-volatile memory in the disk drive and then is used for the operation of the disk drive, as described above.

On the other hand, if the reading of the system information from the original copy of the disk-type recording medium is determined as being unsuccessful, a backup copy portion of the disk-type recording medium on which a backup of the system information is stored is searched for in operation S340. In operation S350, the system information is read from the searched backup portion of the disk-type recording medium. In operation S360, like in operation S330, it is determined whether or not the system information has been successfully read from the backup copy portion of the disk-type recording medium in operation S340, by, for example, creating parity of the read system information with previously stored parity or checking whether or not a bit error rate obtained in the process of reading the system information from the backup copy portion of the disk-type recording medium exceeds a predetermined value.

If the reading of the system information from the backup copy portion of the disk-type recording medium is determined as being unsuccessful, a user is informed in operation S370 that a critical error has occurred in the disk drive.

On the other hand, if the reading of the system information from the backup copy portion of the disk-type recording medium is determined as being successful, the read system information is restored onto the original copy portion of the disk-type recording medium in operation S380. By doing so, the system information is always stored on at least two different portions of the disk-type recording medium. Thus, it is possible to more safely manage the system information. If the system information read from the backup copy portion of the disk-type recording medium cannot be restored onto the original copy portion of the disk-type recording medium, it is determined that the original copy portion of the disk-type recording medium is physically defective. Thereafter, another portion of the disk-type recording medium is set as a new original copy portion, and then the system information read from the backup copy portion of the disk-type recording medium is restored onto the new original copy portion.

As described above, each of the system information may be recorded on at least one additional backup copy portion of the disk-type recording medium. Therefore, in a case where the system information cannot be successfully read from either the original copy portion or a first backup portion of the disk-type recording medium, the system information is sequentially read from additional backup copy portions by successively checking whether the reading from each backup copy portion is successful.

For example, If the system information is successfully read from the second backup copy portion of the additional backup copy portions, the read system information is restored onto the original copy portion of the disk-type recording medium is used for the operation of the disk drive, as described above.

If the system information cannot be successfully read from the second backup copy portion of the additional backup copy portions, additional backup copy portions of the system information are successively searched for on the disk-drive recording medium. Once the system information is successfully read from one of the additional backup copy portions, the read system information is restored onto the original copy portion of the disk-type recording medium is used for the operation of the disk drive, as described above.

If the system information cannot be successfully read from any of the additional backup copy portions, the user is warned that an error has occurred on the disk-type recording medium.

Figure 4A:
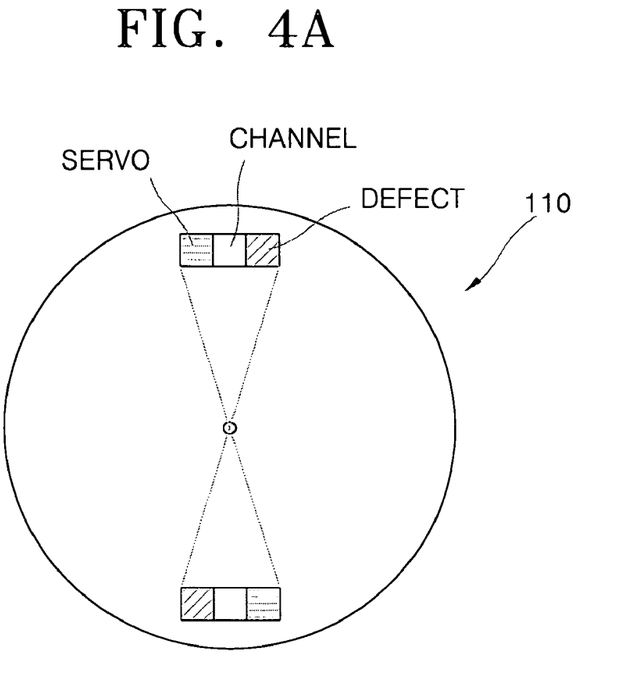
FIGS. 4A and 4B are diagrams of system information recorded on a recording medium.
Figure 4B:
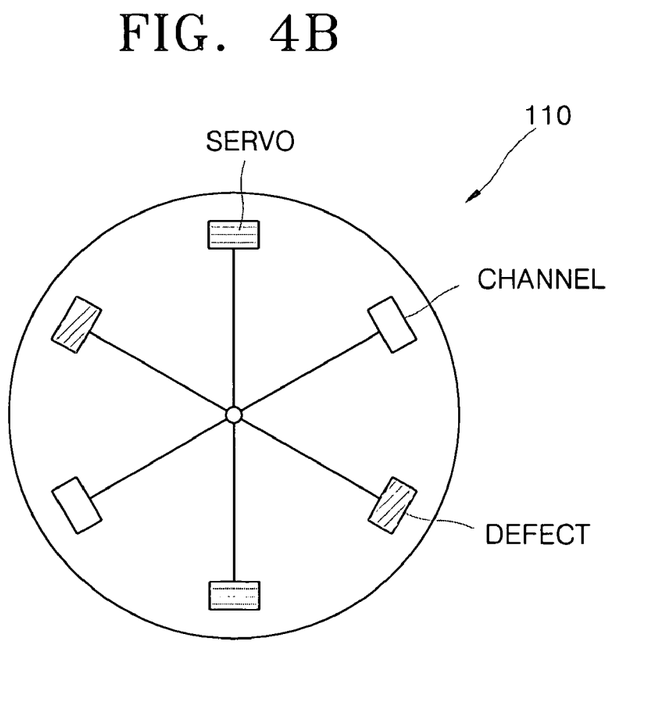

FIGS. 4A and 4B are diagrams illustrating examples of system information recorded according to embodiments of the present invention. In FIG. 4A, servo correction/optimization information (SERVO), recording and reading channel optimization information (CHANNEL), and defect information (DEFECT) regarding physical defects on a disk-type recording medium are recorded on either side of the disk-type recording medium. Since, in FIG. 4A, SERVO, CHANNEL, and DEFECT are arranged in a row on either side of the disk-type recording medium, it is relatively easy to record the system information on the disk-type recording medium or read the system information from the disk-type recording medium. However, the three pieces of information constituting the system information may be damaged or lost altogether. On the other hand, in FIG. 4B, the servo correction/optimization information (SERVO), the recording and reading channel optimization information (CHANNEL), and the defect information (DEFECT) and their respective backup copies are respectively recorded on six different portions of the disk-type recording medium so that the original copy and backup copy of each of SERVO, CHANNEL, and DEFECT are stored on two different portions of the disk-type recording medium, which are as far away from each other as possible. In this case, it is rather complicated to record the system information on the disk-type recording medium or read the system information from the disk-type recording medium. However, it is less likely that the pieces of information constituting the system information will be lost altogether.

According to the present invention, it is possible to safely store system information, which is very important for properly operating a disk drive, by making a backup copy of the system information.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disk drive having a single head for recording data on and reading data from a disk-type recording medium, the disk drive comprising:
   a spindle motor to rotate the disk-type recording medium; and
   a controller to drive the spindle motor and the single head, wherein the controller drives the single head to record system information of the disk drive on an original copy portion and at least one backup copy portion of the disk-type recording medium.

2. The disk drive of claim 1, wherein the controller is a micro-controller to read the system information from the backup copy portion of the disk-type recording medium when the system information cannot be read from the original copy portion of the disk-type recording medium and to restore the system information read from the backup portion of the disk-type recording medium onto the original copy portion of the disk-type recording medium.

3. The disk drive of claim 2, wherein the controller positions the original copy portion and backup copy portion of the disk-type recording medium to be located as far away from each other as possible.

4. The disk drive of claim 2, wherein the system information includes at least one of:
    servo correction/optimization information regarding the single head's track following and track seeking operations;
    recording and reading channel optimization information regarding optimization of recording and reading channels; and
    defect information regarding physical defects on the disk-type recording medium.

5. A method of recording system information of a disk drive on a disk-type recording medium and reading the system information from the disk-type recording medium, the disk drive having a single head for recording data on and reading data from the disk-type recording medium, the method comprising:
    preparing the system information;
    determining an original copy portion and at least one backup copy portion of the disk-type recording medium on which to record the system information;
    storing the system information in the original copy portion and backup copy portion of the disk-type recording medium; and
    reading the system information from the disk-type recording medium.

6. The method of claim 5, wherein locations of the original copy portion and backup copy portion of the disk-type recording medium are determined to be respectively located as far away from each other as possible.

7. The method of claim 5, wherein reading the system information from the disk-type recording medium, comprises:
    reading the system information from the original copy portion of the disk-type recording medium;
    determining whether the system information has been successfully read from the original copy portion of the disk-type recording medium;
    reading the system information from the backup copy portion of the disk-type recording medium if the system information is determined to have been unsuccessfully read from the original copy portion of the disk-type recording medium;
    determining whether the system information has been successfully read from the backup copy portion of the disk-type recording medium;
    warning a user that an error has occurred on the disk-type recording medium if the system information is determined to have been unsuccessfully read from the backup copy portion of the disk-type recording medium; and
    restoring the system information read from the backup copy portion of the disk-type recording medium onto the original backup portion of the disk-type recording medium if the system information is determined to have been successfully read from the backup copy potion of the disk-type recording medium.

8. The method of claim 7, wherein restoring the system information read from the backup copy portion of the disk-type recording medium onto the original backup portion of the disk-type recording medium comprises:
    determining whether the system information has been successfully recorded on the original copy portion of the disk-type recording medium;
    changing the original copy portion of the disk-type recording medium with another portion of the disk-type recording medium if the system information is determined to have been unsuccessfully recorded on the original copy portion; and
    restoring the system information read from the backup copy portion of the disk-type recording medium onto a renewed original copy portion of the disk-type recording medium.

9. The method of claim 5, wherein the system information includes at least one of:
    servo correction/optimization information regarding the single head's track following and track seeking operations;
    recording and reading channel optimization information regarding optimization of recording and reading channels; and
    defect information regarding physical defects on the disk-type recording medium.

10. A disk drive having a single head for recording data on and reading data from a disk-type recording medium, the disk drive comprising:
    a controller to drive the single head to read and record system information of the disk drive on multiple portions of the disk-type recording medium in order to more safely manage the system information.

11. The disk drive of claim 10, wherein the system information recorded on the disk-type recording medium comprises at least one of:
    servo correction/optimization information regarding the single head's track following and track seeking operations;
    recording and reading channel optimization information regarding optimization of recording and reading channels; and
    defect information regarding physical defects on the disk-type recording medium.

12. The disk drive of claim 11, wherein the single head records each of the system information of the disk drive on multiple portions of the disk-type recording medium.

13. The disk drive of claim 12, wherein the multiple portions of the disk-type recording medium comprise:
    an original copy portion in which to record an original copy of each of system information; and
    a backup copy portion in which to record a backup copy of each of system information.

14. The disk drive of claim 13, wherein the original copy portion is recorded as far apart as possible from the respective backup copy portion in order to prevent a defect on a certain portion of the disk-type recording medium from spreading to both the original copy portion and backup copy portion.

15. A method of recording system information of a single head disk drive on a disk-type recording medium and reading system information from the disk-type recording medium, the method comprising:
    determining a first and a second portion of the disk-type recording medium on which to record the system information; and
    recording the system information in the determined first portion and second portion of the disk-type recording medium.

16. The method of claim 15, wherein the determining the first and second portions of the disk-type recording medium comprises locating the first and second portions as far apart as possible from each other in order to prevent a defect on a certain portion of the disk-type recording medium from spreading to both the first and second portions.

17. The method of claim 15, wherein the system information includes at least one of:
  servo correction/optimization information regarding the single head's track following and track seeking operations;
  recording and reading channel optimization information regarding optimization of recording and reading channels; and
  defect information regarding physical defects on the disk-type recording medium.

18. The method of claim 17, wherein reading the system information from the disk-type recording medium, comprises:
  reading the system information from the first portion of the disk-type recording medium;
  determining if the system information is successfully read from the first portion of the disk-type recording medium;
  storing the system information in a memory device of the disk drive if the system information is successfully read from the first portion of the disk-type recording medium;
  reading the system information from the second portion of the disk-type recording medium if the system information is not successfully read from the first portion of the disk-type recording medium;
  determining if the system information has been successfully read from the second portion of the disk-type recording medium.

19. The method of claim 18, wherein the determining whether the system information has been successfully read from the first portion of the disk-type recording medium comprises creating a parity value for the read system information and comparing the parity value with a previously stored parity value.

20. The method of claim 18, wherein the determining whether the system information has been successfully read from the first portion of the disk-type recording medium comprises checking if a bit error obtained in the process of reading the system information from the first copy portion of the disk-type recording medium exceeds a predetermined value.

21. The method of claim 18, wherein the determining whether the system information has been successfully read from the second portion of the disk-type recording medium comprises creating a parity value for the read system information and comparing the parity value with a previously stored parity value.

22. The method of claim 18, wherein the determining whether the system information has been successfully read from the second portion of the disk-type recording medium comprises checking if a bit error obtained in the process of reading the system information from the second copy portion of the disk-type recording medium exceeds a predetermined value.

23. The method of claim 18, further comprising restoring the system information in the first portion of the disk-type recording medium if the system information is successfully read from the second portion of the disk-type recording medium.

24. The method of claim 23, further comprising determining that the first portion of the disk-type recording medium is physically defective if the system information from the second portion cannot be restored onto the first portion.

25. The method of claim 24, further comprising selecting a new portion of the disk-type recording medium and restoring the system information from the second portion onto the new portion.

26. The method of claim 18, further comprising warning a user that an error has occurred on the disk-type recording medium if the system information is not successfully read from the second portion of the disk-type recording medium.

27. The method of claim 18, wherein the first and second portions of the disk-type recording medium comprise an original copy portion and a backup copy portion, respectively.

* * * * *